J. E. MILLS.
SCREWDRIVER.
APPLICATION FILED SEPT. 19, 1919.

1,394,438.

Patented Oct. 18, 1921.

Inventor:
JAMES E. MILLS,
Andrew B. Remick
His Attorney.

UNITED STATES PATENT OFFICE.

JAMES E. MILLS, OF ST. LOUIS, MISSOURI.

SCREWDRIVER.

1,394,438.  Specification of Letters Patent.  Patented Oct. 18, 1921.

Application filed September 19, 1919. Serial No. 324,872.

*To all whom it may concern:*

Be it known that I, JAMES E. MILLS, a citizen of the United States, and residing at St. Louis, Missouri, have invented the new and useful Improvement in Screw-drivers, of which the following is a specification.

This invention relates to screw drivers, and more particularly to screw drivers of the type adapted to grip and retain a screw to faciliate its insertion and manipulation.

In screw drivers of this type, as now constructed, the gripping means operates to engage the screw head at the ends of the slot. Such a construction is, however, unsatisfactory because it not only fails to have the required range adapting it to screw heads of different diameters, but moreover it cannot be used for the insertion of screws which must be countersunk.

One of the objects of this invention, therefore, is to provide a screw driver having an expansible element or tip which is adapted to enter the slot of a screw so as to grip in the slot and thereby retain the screw for manipulation.

Further objects will appear from the detail description taken in connection with the accompanying drawing, in which.

Figure 1:
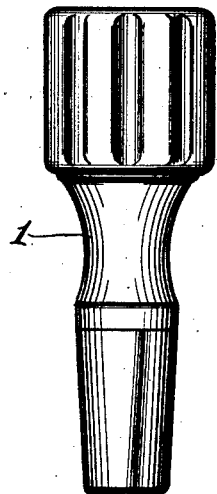
Figure 1 is a side elevation of a screw driver embodying this invention.
Figure 3:
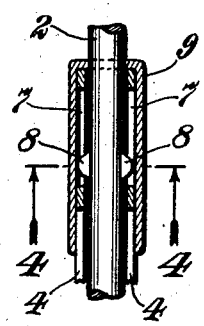
Fig. 3 is a section on the line 3—3, Fig. 2.

Referring to the accompanying drawing, 1 designates a screw driver handle which has a shank 2 provided at its end with the usual tip 3. The handle, shank and tip may be of any suitable construction, well known in the prior art.

Mounted on the shank 2 so as to be slidable therealong, is an expansible element 4. This element may be constructed of sheet metal formed to shape and it comprises a pair of jaws 5 which contract toward their free ends and are shaped to provide the element 6 of a tip. The body of the adjustable element is provided with slots 7 and these slots receive lugs or ribs 8 struck up from the shank. A knurled sleeve 9 covers the end of the element and may be secured thereto in any suitable manner as by being forced thereon. The expansible element is made of a springy material, such as sheet steel so as to have considerable resiliency and the tips 6 may be hardened. These tips will thus be retained normally in engagement, due to the inherent resiliency of the metal. The expansible element can readily be assembled on the shank, and when in position thereon and retained by the lugs 8 sliding in the slots 7 and the whole secured by the sleeve 9, the expansible element has a limited sliding movement on the shank.

Figure 2:
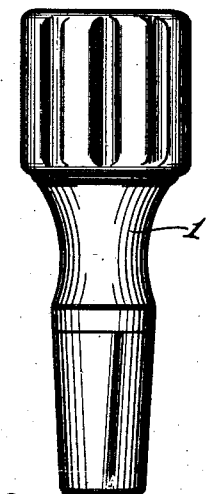
Fig. 2 is a view similar to Fig. 1, but showing the expansible element in section.
Figure 4:
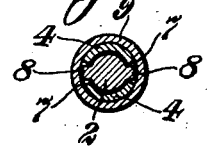
Fig. 4 is a section on the line 4—4, Fig. 3.
Figure 5:
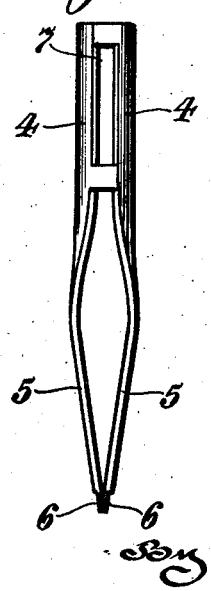
Fig. 5 is a detail of the expansible element.
Figure 5:
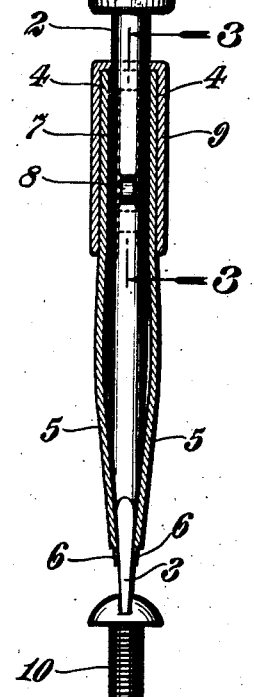

The operation and use of this device is as follows: The shank 2, with its tip 3, is drawn into the expansible element so as to cause its tips 6 to come together. This tip can then be inserted in the slot of a screw 10 and by then moving the shank toward the screw, the tip 3 wedges between the jaws 5 so as to spread them apart and cause the expansible element to firmly grip in the slot of the screw head. The screw can now be inserted in its proper hole and driven. Where the fastening is a light one, the screw can be driven home by the expansible tip; if, however, the fastening is a heavy one, then after the screw has been started, the expansible tip is drawn back of the tip 3 as shown in Fig. 2 and the screw is driven home by the tip 3.

It will, therefore, be seen that this invention accomplishes its objects. The device is exceedingly simple in construction and is such that it may be manipulated by the use of one hand; if the shank is withdrawn into the expansible element thereby causing the tips 6 to come together, the latter can be readily inserted into the screw and then by simply pushing on the handle, the screw can be gripped; then after the screw has been started, the expansible element may be drawn back by the engagement of the thumb with the knurled sleeve 9 to permit the screw to be driven home by the main tip 3 on the shank of the screw driver.

In view of the fact that the screw is gripped inside of its hole, the expansible tip is adjustable to screw heads of different diameters and moreover is adapted for structures where the screw must be countersunk.

It is obvious that various changes may be made in the details of construction without departing from the spirit of this invention; it is, therefore, to be understood that this invention is not to be limited to this specific detail shown and described.

Having thus described the invention, what is claimed is:

A screw driver, comprising a shank provided with a main screw driving tip, and a double expansible starting tip on said shank and movable beyond said driving tip, and expansible thereby, adapted to grip and hold the screw while being set, said starting tip being adapted to be moved clear of said driving tip while the screw is being driven.

In testimony whereof I affix my signature this 11th day of September, 1919.

JAMES E. MILLS.